(12) United States Patent
Ryu et al.

(10) Patent No.: US 12,547,238 B2
(45) Date of Patent: Feb. 10, 2026

(54) CONTEXT-BASED IN-VEHICLE IMMERSIVE VISUAL OUTPUT

(71) Applicant: Faurecia IRYStec Inc., Montreal (CA)

(72) Inventors: Seungchul Ryu, Greenfield Park (CA); Alexandre Okon, Montreal (CA); Hyunjin Yoo, Nepean (CA); David Ta, Montgeron (FR); Jean Lorchat, Montreal (CA); Tara Akhavan, Paris (CA)

(73) Assignee: Faurecia IRYStec, Inc., Montreal (CA)

( * ) Notice: Subject to any disclaimer, the term of this patent is extended or adjusted under 35 U.S.C. 154(b) by 49 days.

(21) Appl. No.: 18/397,745

(22) Filed: Dec. 27, 2023

(65) Prior Publication Data

US 2025/0216927 A1    Jul. 3, 2025

(51) Int. Cl.
  *G06F 3/01* (2006.01)
  *G06V 20/59* (2022.01)

(52) U.S. Cl.
  CPC ............ *G06F 3/011* (2013.01); *G06V 20/597* (2022.01)

(58) Field of Classification Search
  None
  See application file for complete search history.

(56) References Cited

U.S. PATENT DOCUMENTS

| | | | |
|---|---|---|---|
| 10,800,327 B1 * | 10/2020 | Claywell | B60Q 3/80 |
| 11,620,099 B1 | 4/2023 | Gerhardt et al. | |
| 2014/0218187 A1 * | 8/2014 | Chun | G16H 40/67 340/439 |
| 2023/0356654 A1 * | 11/2023 | Cong | B60Q 3/60 |
| 2024/0409047 A1 * | 12/2024 | McRoy | B60R 16/037 |

FOREIGN PATENT DOCUMENTS

| | | |
|---|---|---|
| CN | 116238333 A | 6/2023 |
| DE | 102014004861 A1 | 9/2014 |
| JP | 2017176580 A | 10/2017 |
| KR | 102491730 B1 | 1/2023 |

OTHER PUBLICATIONS

Babusiak et al., Design of Smart Steering Wheel for Unobtrusive Health and Drowsiness Monitoring. Sensors. 2021; 21(16):5285.
Lui et al., "Texture-Aware Emotional Color Transfer Between Images," in IEEE Access, vol. 6, pp. 31375-31386, 2018, doi: 10.1109/ACCESS.2018.2844540.
Elad et al. "Style Transfer Via Texture Synthesis," in IEEE Transactions on Image Processing, vol. 26, No. 5, pp. 2338-2351, May 2017, doi: 10.1109/TIP.2017.2678168.
Russell, J.: A circumplex model of affect. Journal of personality and social psychology 39(6), 1161-1178 (1980) based on the relationship between emotion and color (Color and emotion: effects of hue, saturation, and brightness, Psychological Research, 2018).

* cited by examiner

*Primary Examiner* — Thomas S McCormack
(74) *Attorney, Agent, or Firm* — Reising Ethington P.C.

(57) ABSTRACT

An in-vehicle display immersive system and method is provided, particularly for generating a visual output for a vehicle cabin. The method includes: determining a color tone profile, a texture style profile and/or a driver emotion profile, wherein the color tone profile and/or the texture style profile are determined based on image data captured by an exteriorly-facing camera, and wherein the driver emotion profile is determined based on sensor data captured by a driver monitoring sensor; and determining a visual output based on the driver emotion profile, the color tone profile, and/or the texture style profile.

18 Claims, 4 Drawing Sheets

CONTEXT-BASED IN-VEHICLE IMMERSIVE VISUAL OUTPUT

TECHNICAL FIELD

The invention relates to methods and systems for controlling outputs of light generating devices in a vehicle, such as electronic displays and lights (e.g., light emitting diodes (LEDs)), and, more particularly, to coordinating a visual output of said light generating objects, including graphic/content selection and/or image/graphic image processing, such as modifying color attributes of the visual output.

BACKGROUND

Nowadays, certain display systems, such as those used in automotive cockpits, may include a display system that combines several color display devices as well as other ambient/diffuse lighting sources, and this can introduce undesirable color differences among the actual outputted or perceived outputs. Various electronic displays may be used, such as one or more of, for example, liquid crystal displays (LCDs), light emitting diode (LED) based displays (e.g., organic LED (OLED), LED LCD), and projectors (e.g., LCD projectors, digital light processing (DLP) projectors). Such in-vehicle display systems often further include other ambient or diffuse light sources, such as LED arrays, LED strings, etc. In this sense, both an OLED high-resolution television screen and a device that includes a single LED used for producing visible light are considered a "light source" or "light generating device".

Graphical or display lighting refers to light sources that are part of electronic displays or graphical interfaces, such as for backlighting a screen or for transmitting colored light. This lighting is generally used to convey information or enhance aesthetics through images, text, and other symbols or like graphics. In the automotive context, this may include the backlighting of the instrument cluster, infotainment screens, and control panels. Ambient/diffuse lighting refers to a light source that emits light with no defined or distinct image, text, or symbols, and may light a space evenly and softly. In an automotive setting, ambient lighting is used inside the vehicle cabin to provide soft, indirect light that enhances visibility without causing glare or harsh shadows, and may be used to provide mood lighting, such as through allowing hue modification by a user. Examples of ambient/diffuse lights include LED strips or panels placed under the dashboard, in door panels, or around the center console, offering a subtle and evenly distributed light to create a comfortable and safe driving environment.

Recently, more displays have been introduced in automotive applications to provide a better driving experience and provide more information effectively to the driver. The combination of various displays can provide an enhanced user experience to drivers and passengers; particularly, for example, pillar-to-pillar displays allow utilization of the full width of the dashboard. Besides combining two or more displays screens, sparse LED arrays can also be incorporated into this system. An in-cabin immersive system can include different LCD displays, sparse-LED arrays, E-mirror displays, a rear-view display, and in-car lights. For example, U.S. Pat. No. 11,620,099, issued Apr. 4, 2023, describes a display system for color matching multiple displays, such as those that may be used in an automobile.

However, even though color matching techniques such as the one described in U.S. Pat. No. 11,620,099 improve the experience due to improving visual output consistencies (e.g., between colors), it has been discovered that immersiveness for the driver or other passengers may be improved through incorporating contextual information, such as that which concerns the driver emotion's or mental state (introspective context or an inward perception) and/or the driver's environment (extrospective context or outward perception), as this aids in identifying visual outputs that are likely to be received positively by the driver or passenger.

Accordingly, there is provided a solution that provides enhanced or increased immersiveness between the driver and the vehicle so as to provide a better driving experience to the drivers, leading to enhancing driving performance and reducing undesired driving errors.

SUMMARY

According to one aspect of the disclosure, there is provided a method of generating a visual output for a vehicle cabin. The method includes: determining a color tone profile, a texture style profile and/or a driver emotion profile. The color tone profile and/or the texture style profile are determined based on image data captured by an exteriorly-facing camera, and the driver emotion profile is determined based on sensor data captured by a driver monitoring sensor. The method further includes: determining a visual output based on the driver emotion profile, the color tone profile, and/or the texture style profile.

According to various embodiments, the method may further include any one of the following features or any technically-feasible combination of some or all of the features:
  determining the color tone profile, wherein the visual output is determined based on using a color transfer algorithm that generates output color information based on input color information, and wherein the input color information is or is generated based on color information within the image data as represented by the color tone profile;
  the image data represents an image of a scene, and wherein the color information within the image data corresponds to color information of one or more pixels within a determined region of the image;
  the determined region of the image is determined based on output of a classifier, and wherein the classifier is used to classify portions of the image;
  the determined region of the image is predetermined based on one or more pixel coordinates of the image;
  determining the driver emotion profile, and wherein the driver emotion profile specifies one or more emotions selected from a plurality of predetermined emotions, and wherein each emotion of the plurality of predetermined emotions is associated with modification data indicating how the emotion affects the visual output;
  determining the driver emotion profile, and wherein the driver emotion profile is a regressive output represented by one or more tensors;
  continuously obtaining updated image data from the exteriorly-facing camera, wherein the determining steps are each performed using the updated image data so as to determine an updated visual output as the visual output for each iteration, and wherein presentation of the visual output is continuously updated in accordance with the updated visual output; and/or
  the visual output is an immersive visual output that includes a display output and a light output, wherein the display output is information indicating an output for a display screen, and wherein the light output is information indicating an output for an ambient or diffuse light source.

According to another aspect of the disclosure, there is provided an in-vehicle immersive display system. The in-vehicle immersive display system includes: an electronic display installed in a vehicle and configured to provide a display output; a light generating device installed in the vehicle and configured to provide a light output; a camera installed in a vehicle and configured to provide image data; and a controller installed in a vehicle and configured to determine the display output and the light output based at least in part on the image data.

According to various embodiments, the in-vehicle immersive display system may further include any one of the following features or any technically-feasible combination of some or all of the features:
- the controller is further configured to: determine a color tone profile and a texture style profile based on image data captured by the camera; determine a driver emotion profile based on sensor data captured by a driver monitoring sensor; and determine a visual output for an immersive display system based on the color tone profile and the texture style profile, wherein the visual output is displayed by the immersive display system and s constituted by the display output and the light output;
- the driver emotion profile specifies one or more emotions selected from a plurality of predetermined emotions, and wherein each emotion of the plurality of predetermined emotions is associated with modification data indicating how the emotion affects the visual output;
- the driver emotion profile is a regressive output represented by one or more tensors;
- the display output and the light output are determined based on using a color transfer algorithm that generates output color information based on input color information, and wherein the input color information is, or is generated based on, color information within the image data;
- the image data represents an image of a scene, and wherein the color information within the image data corresponds to color information of one or more pixels within a determined region of the image;
- the determined region of the image is determined based on output of a classifier, and wherein the classifier is used to classify portions of the image;
- the determined region of the image is predetermined based on one or more pixel coordinates of the image;
- the controller is further configured to continuously obtain updated image data from the exteriorly-facing camera, wherein a visual output is displayed by the immersive display system and is constituted by the display output and the light output, wherein the determining operations are each performed using the updated image data so as to determine an updated visual output as the visual output for each iteration, and wherein display of the visual output is continuously updated in accordance with the updated visual output; and/or
- wherein a visual output is displayed by the immersive display system and is constituted by the display output and the light output, and wherein the visual output is information indicating an output for a display screen and an output for an ambient light source.

According to yet another aspect of the disclosure, there is provided an in-vehicle immersive display system. The in-vehicle immersive display system includes: an electronic display installed in a vehicle and configured to provide a display output; a diffuse light generating device installed in the vehicle and configured to provide a light output; an exteriorly-facing camera installed in a vehicle and configured to provide image data; a driver monitoring sensor installed in a vehicle and configured to provide driver monitoring sensor data; and a controller installed in a vehicle and configured to determine the display output and the light output based at least in part on the image data provided by the exteriorly-facing camera and the driver monitoring sensor data provided by the driver monitoring sensor.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

Figure 1:
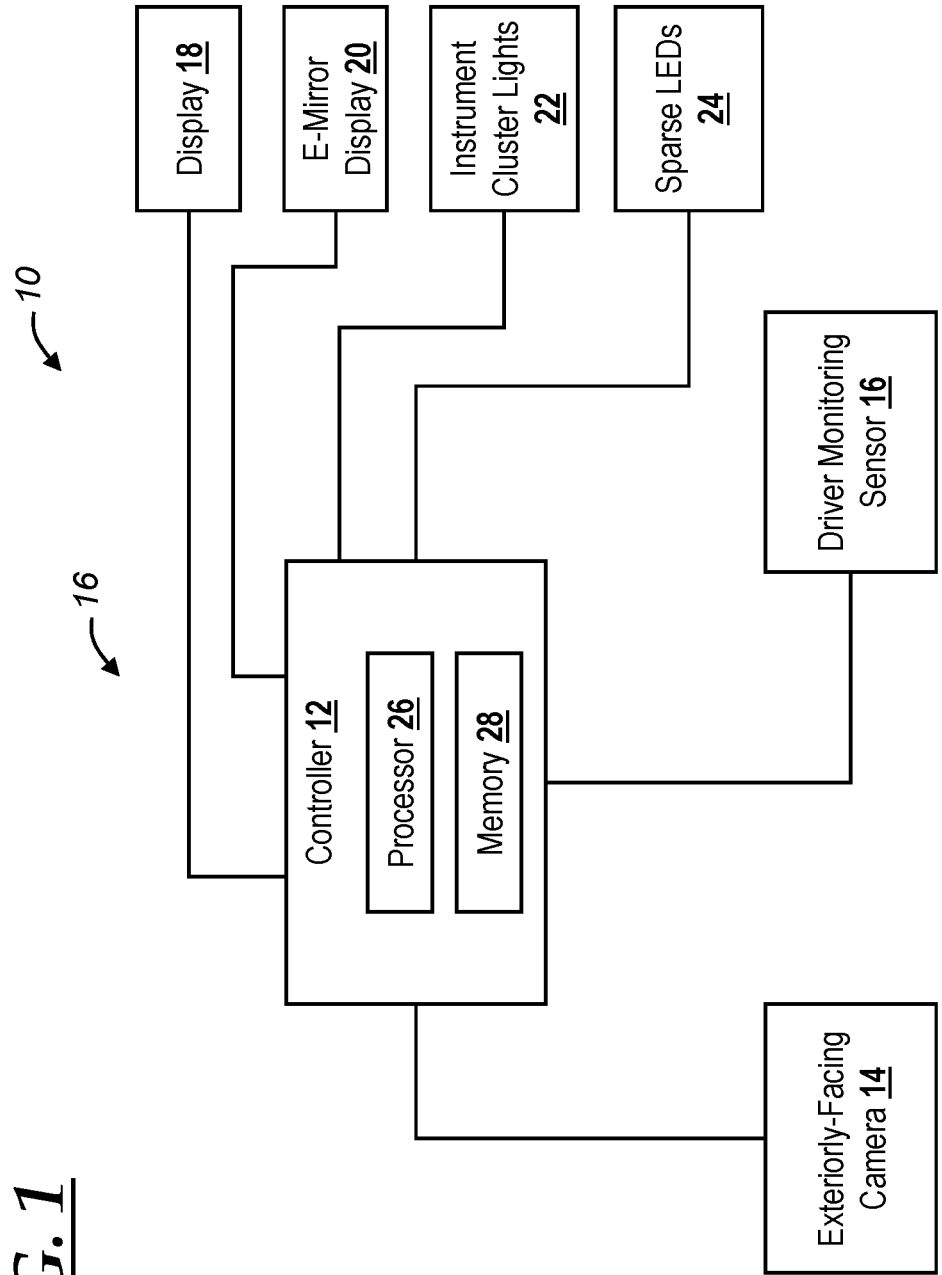
FIG. 1 is a block diagram illustrating an in-vehicle immersive display system, according to one embodiment.

A system and method are provided for generating a visual output for consumption by a driver or other vehicle passenger, so as to enhance in-cabin immersiveness and/or otherwise improve the in-vehicle experience. The word "immersiveness", when used in connection with a vehicle (e.g., "in-vehicle immersiveness", "in-cabin immersiveness"), refers to an individual's sensory engagement with the vehicle, including from a visual and/or audible perspective. Nowadays, vehicles commonly have cabins with numerous different light sources, such as displays for infotainment units, electronic mirror (or "e-mirror") displays, instrument cluster lights/displays, light emitting diode (LED) arrays, other LED lights, etc. In order to enhance the in-vehicle experience, light outputs may be coordinated, such as where the same, similar, or complementary colors are used for a light output for multiple different light sources—this light output is referred to herein as a visual output. This light or content/display screen coordination is used to enhance in-vehicle immersiveness.

According to embodiments, the visual output generated by the system is an immersive visual output, which is a visual output that is formed by simultaneously (i.e., at the same time) generating light using multiple light sources within a vehicle; for example, a display generates a first visual output and a LED array generates a second visual output, and the first visual output and the second visual output together constitute an immersive visual output; however, in other embodiments, other light sources may be used to generate an immersive visual output, such as those mentioned above.

According to embodiments, an audible output is generated by the system and, in embodiments, is output simultaneously as the immersive visual output thereby providing an immersive multi-sensory output, more specifically an immersive audiovisual output. The audible output is generated by using a loudspeaker, for example; however, a variety of different audio output devices may be used.

According to embodiments, in-vehicle immersiveness is enhanced through connecting the driver (or other vehicle passenger) to the visual output by way of coordinating the visual output with the vehicle's surrounding environment and/or the driver's emotional state.

According to embodiments, there is provided an in-car immersiveness enhancement framework based on the vehicle's driving environment and the driver's emotional status. By incorporating such information into the display or other visual output of the in-vehicle displays and lights, the driver's driving performance and mental state may be improved. Specifically, in embodiments, the framework is used to generate new content (and/or revised content) for immersive displays and systems, providing enhanced immersiveness across different displays, systems, and driving environments. The immersiveness-enhanced contents are generated based on the color/style transfer, analysis of the driving environment, and driver's emotional status recognition, at least in one embodiment. More specifically, according to embodiments, there is provided a framework that enhances the in-cabin/in-vehicle immersiveness by providing consistent color tone and texture style across different displays, providing adjusted content according to the driving environments, and/or providing a proper color adjustment in in-cabin immersive displays and systems according to the driver's emotional status.

With reference to FIG. 1, there is shown an in-vehicle immersive display system 10 having a controller 12, an exteriorly-facing camera 14, a driver-facing camera used as a driver monitoring sensor 16, an electronic display 18, an e-mirror display 20, instrument cluster lights 22, and sparse LEDs 24. The controller 12 has at least one processor 26 and memory 28 storing computer instructions that, when executed by the at least one processor 26, cause the functionality attributed to the controller 12 to be performed, such as one or more steps of the method. The in-vehicle immersive display system 10 of FIG. 1 is one embodiment and, in other embodiments, the in-vehicle immersive display system may include one or more other components in addition to or in lieu of one or more of the components of the stem 10.

The controller 12 is used for controlling a visual output of the immersive in-vehicle display system 10, such as graphics displayed on the display 18 or a color and/or brightness of light emitted by the sparse LEDs 24. As mentioned above, the computer instructions stored on the memory 28 instruct the controller 12 to perform one or more of the steps of the method discussed below, at least in embodiments. The controller 12 is communicatively coupled to the exteriorly-facing camera 14 and the driver-facing camera 16 so as to receive image data from the cameras 14,16. The controller 12 is also communicatively coupled to the output devices 18-24, such as via a controller area network (CAN) bus or wireless local area network (WLAN) connection, for example. However, any suitable communication connection or link may be used.

Although the controller 12 is described as a single device, it will be appreciated that multiple computers or devices may be used as the controller 12, together configured to perform the method and any other functionality attributed to the controller 12, as described herein. It will also be appreciated that the computer instructions may be stored on different physical memory devices and/or executed by different processors or computers of the controller 12, together causing performance of the method and attributed functionality discussed herein.

Any one or more of the processors discussed herein may be implemented as any suitable electronic hardware that is capable of processing computer instructions and may be selected based on the application in which it is to be used. Examples of types of processors that may be used include central processing units (CPUs), graphics processing units (GPUs), field-programmable gate arrays (FPGAs), application specific integrated circuits (ASICs), microprocessors, microcontrollers, etc. Any one or more of the memory discussed herein may be implemented as any suitable type of non-transitory, computer-readable memory that is capable of storing data or information in a non-volatile manner and in an electronic form so that the stored data or information is consumable by the processor. The memory may be any a variety of different electronic memory types and may be selected based on the application in which it is to be used. Examples of types of memory that may be used include including magnetic or optical disc drives, ROM (read-only memory), solid-state drives (SSDs) (including other solid-state storage such as solid state hybrid drives (SSHDs)), other types of flash memory, hard disk drives (HDDs), non-volatile random access memory (NVRAM), etc. It should be appreciated that any one or more of the computers or controllers discussed herein may include other memory, such as volatile RAM that is used by the processor, and/or multiple processors.

In one embodiment, the at least one processor 26 includes a central processing unit (CPU) and a graphics processing unit (GPU) (or even a tensor processing unit (TPU)), each of which is used to perform different functionality of the controller 12. For example, the GPU is used for image signal processing and inference of neural networks (or any like machine learning models) as well as for any training, such as online training carried out for adaptable learning carried out after initial deployment; on the other hand, other functionality may be performed by the CPU. Of course, this is but one example of an implementation for the controller 12, as those skilled in the art will appreciate that other hardware devices and configurations may be used, oftentimes depending on the particular application in which the controller 12 is used.

The exteriorly-facing camera 14 is an example of an environment sensor and a visible light sensor. As used herein, a visible light sensor is a light sensor that captures visible light represented as an array of pixels that together constitute a visible light image. The visible light sensor is a camera that captures and represents a scene using a visible light color space or domain, such as RGB. According to embodiments, the visible light sensor is a digital camera, such as one employing a CMOS (Complementary Metal-Oxide-Semiconductor) sensor, CCD (Charge-Coupled Device) sensor, or Foveon sensor.

The exteriorly-facing camera 14 is configured to capture visible light images, which are images representing visible light captured by an image sensor. The exteriorly-facing camera 14 may be any of variety of suitable camera types, such as digital single-lens reflex (DSLR) camera, mirrorless cameras, dash cams (e.g., Garmin Dash Cam 56™), compact digital cameras, pinhole cameras, etc. The exteriorly-facing camera 14 is a camera and is "exteriorly-facing" as the camera's field of view faces and captures an area outside of the vehicle, such as the road on which the vehicle is travelling, the skyline, and/or the sky. The exteriorly-facing camera 14 is used to capture visible light image data, and this visible light image data is used to determine a visual output of the immersive display system 10, such as through determining a color tone profile that sets color tone(s) for use in content displayed on the electronic display 18 or a color or brightness of diffuse light emitted by the sparse LEDs 24. In embodiments, the visible light image data is also displayed for the driver or passenger of the vehicle, such as through displaying a live video stream of the visible light image data captured by the exteriorly-facing camera 14 on the display 18. Although only a single environment sensor is included in the depicted embodiment, in other embodiments, the system 10 includes a plurality of environment sensors, such as a plurality of exteriorly-facing cameras.

The driver monitoring sensor 16 is used to determine an emotion or other mental state of the driver, and may be a wearable or fixed sensor that is physically-coupled to the driver (e.g., heart rate sensor in smartwatch worn by the driver) or spaced away from the driver, such as a driver-facing camera or an in-vehicle microphone. In modern automobiles, a suite of sophisticated sensors, such as facial recognition and analysis technology, voice analysis tools, biometric sensors, electroencephalography (EEG), eye tracking systems, movement and gesture analysis, and wearable technology may be employed for driver monitoring. In embodiments, these sensors work in concert to detect and interpret various emotional and mental states of drivers; although, in other embodiments, a single sensor may suffice for determining a driver emotion profile. For example, cameras for facial recognition and analysis can pick up on subtle changes in a driver's expressions, indicating stress or drowsiness, while voice analysis might capture alterations in tone and speech patterns that suggest frustration or fatigue. Heart rate monitors and other biometric sensors embedded in the vehicle (or worn by the user and communicatively coupled to the vehicle) can track physiological responses like increased heart rate, signaling anxiety or excitement. Eye tracking systems monitor the driver's gaze and pupil dilation to detect distraction or decreased alertness. Observing a driver's body language through movement and gesture analysis can reveal signs of agitation or lethargy. Furthermore, data from wearable technology like smartwatches can inform about the driver's overall health and stress levels, influencing their driving behavior. In embodiments, one or more of the driver monitoring sensors may be integrated with machine learning algorithms, which may enable providing a comprehensive understanding of the driver's state. Although only a single driver monitoring sensor is included in the depicted embodiment, in other embodiments, the system 10 may include a plurality of driver monitoring sensors.

In other embodiments, other driver monitoring means besides visible light image processing may be used. For example, Babusiak B, Hajducik A, Medvecky S, Lukac M, Klarak J. Design of Smart Steering Wheel for Unobtrusive Health and Drowsiness Monitoring. Sensors. 2021; 21(16): 5285 teaches a smart steering wheel equipped with an electrocardiograph, oximeter, and an inertial measurement unit, monitors the driver's heart rate, blood oxygenation, and movement patterns. These physiological parameters can provide insights into the driver's emotional state, such as stress or relaxation levels. Convolutional and recurrent neural networks may be used to process this data, potentially recognizing patterns associated with specific emotional states, for example.

The electronic display (or "display") 18 is used to present graphical and/or textual content to a user, and the display 18 may be any of a variety of display devices, such as liquid crystal displays (LCDs), light emitting diode (LED) based displays (e.g., organic LED (OLED), LED LCD), and projectors (e.g., LCD projectors, digital light processing (DLP) projectors), for example. The electronic display 18 is communicatively coupled to the controller 12, and receives content from the controller 12, and the content is displayed. The output content is an example of a visual output.

The electronic mirror or "e-mirror" display 20, and may be used as a part of an electronic mirror (e-mirror or E-mirror) system, which utilizes display technologies to replace or augment conventional reflective mirrors. This e-mirror system primarily comprises exteriorly-facing cameras (such as the exteriorly-facing camera 14) that relay real-time visual information to the display screen(s) of the e-mirror display 20, which are located in the vehicle and arranged to be readily within the driver's field of vision when in the driver's position. Various display technologies may be employed in the e-mirror display 20, such as LCD or OLED displays, for example. The electronic mirror display 20 is communicatively coupled to the controller 12, and receives content from the controller 12, and the content is displayed as a visual output.

The instrument cluster 22 is used to provide important driving information to the driver, such as speed, fuel level, engine temperature, etc., and is often a dashboard component in that it is integrated into the dashboard. The instrument cluster 22 provides at least part of the driving information to the driver through a visual output, which may include LEDs used for backlighting or an electronic display having a display screen. In some embodiments, the instrument cluster 22 provides a visual output through a combination of different light sources, such as using ambient lighting for a first instrument reading and an electronic display for a second instrument reading, for example. The instrument cluster 22 is communicatively coupled to the controller 12, and receives content from the controller 12, and the content is displayed as a visual output. Although the instrument cluster 22 may include an electronic display, in the present embodiment, the electronic display 18 is separate from the instrument cluster 22 and any displays included as a part thereof.

The sparse LEDs 24 are examples of diffuse light generating devices and, in the present embodiment, are lights within the interior of the vehicle, such as within a passenger cabin of the vehicle, and are used to output colored, ambient light. The sparse LEDs 24 may be RGB LEDs (red LED, green LED, blue LED), OLEDs, or Quantum Dot LEDs (QLEDs). However, unlike the display 18, the sparse LEDs generally produce diffuse light and are not arranged to present discernible content over a matrix of pixels. The sparse LEDs 24 are communicatively coupled to the controller 12, and receives content from the controller 12, and the content is displayed as a visual output. Although the instrument cluster 22 may include sparse LEDs, in the present embodiment, the sparse LEDs 24 are separate from the instrument cluster 22 and any sparse LEDs included as a part thereof.

Figure 2:
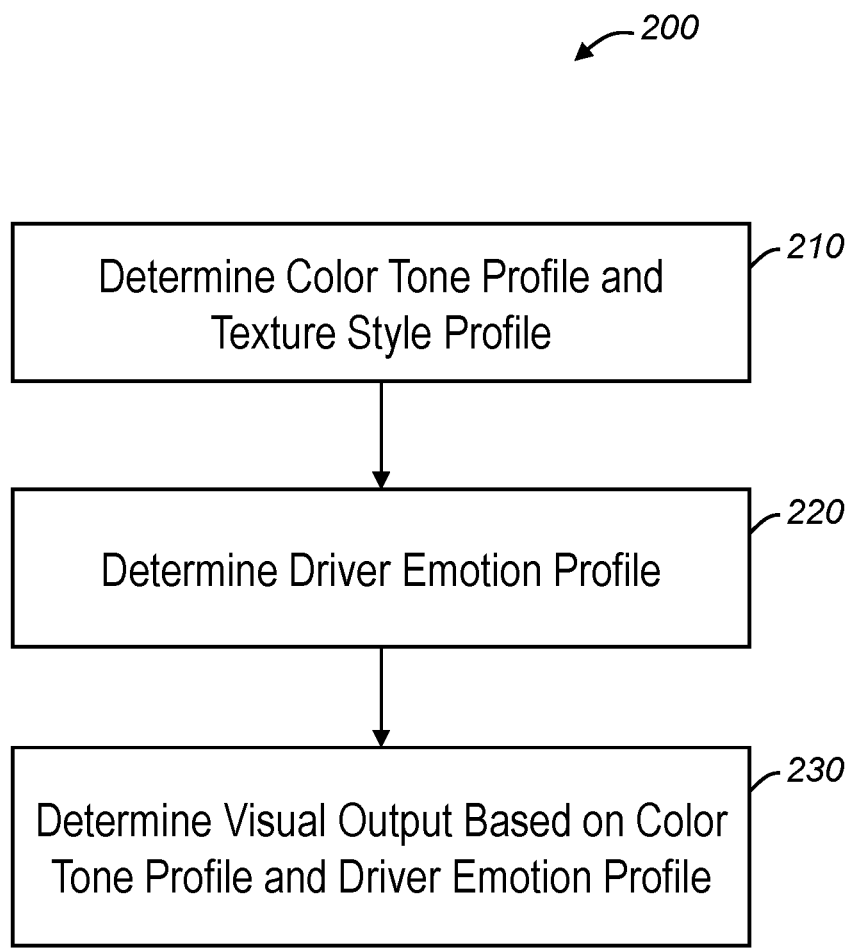
FIG. 2 is a flowchart illustrating a method of generating a visual output for a vehicle cabin, according to one embodiment.

With reference to FIG. 2, there is shown an embodiment of a method 200 of generating a visual output for a vehicle cabin. The method 200 is performed by the in-vehicle immersive display system 10, at least in one embodiment. Although the steps of the method 200 are discussed as being performed in a particular order, it will be appreciated that the steps of the method 200 may be performed in any technically-feasible order, such as where step 220 is performed at the same time as or before step 210.

The method 200 begins with step 210, wherein a color tone profile and a texture style profile are determined based on image data captured by an exteriorly-facing camera; that is, the color tone profile is determined based on image data captured by an exteriorly-facing camera and the texture style profile is determined based on image data captured by the exteriorly-facing camera. The color tone profile refers to color or tone information, such as hue, lightness, and saturation, and may be represented by one or more values (or range(s) of values) for each of these color tone attributes. The texture style profile refers to a set of visual and tactile characteristics that collectively define and standardize a specific texture style, and this profile may include attributes such as pattern repetition, surface roughness or smoothness, reflectivity, and tactile qualities.

In embodiments, the exteriorly-facing camera 14 captures visible light image data of an area outside of the vehicle. This area, which is within the field of view (FOV) of the exteriorly-facing camera 14, may include a sky or other ambient space (e.g., ceiling of a tunnel) above the road on which the vehicle is travelling, referred to as an "overhead area" (even though the overhead area within the FOV at any given time may not be directly over the vehicle, but in front of the vehicle, for example). In another example, the exteriorly-facing camera 14 captures visible light images of an area to the side of the road and/or on the road, referred to as "road area" and the side of the road is referred to specifically as "roadside area" and the road area corresponding to a portion on the road (i.e., not a roadside area) is referred to as "on-road area".

In embodiments, portions of the image corresponding to an overhead area and/or roadside area, instead of the entire image, are used for determining the color tone profile and/or texture style profile. In another embodiment, the on-road area (instead of the roadside area) is used for determining the color tone profile and/or texture style profile. In other embodiments, the entire image may be used for determining the color tone profile and/or texture style profile.

In one example, when the exteriorly-facing camera 14 captures an icy scene, textures that mimic the appearance of snow and ice, with reflections, crystalline structures, and a sense of slickness or glossiness, are selected for use in or as the texture style profile. In this example, the color tone profile includes whites, blues, and other cool tones. And, in another example, when the exteriorly-facing camera 14 captures a sunny scene, textures that smoother and more diffused, with a soft focus to convey the gentle quality of sunlight and a peaceful atmosphere, are selected for use in or as the texture style profile. In this example, the color tone profile includes warm, bright colors like yellows and oranges, creating a sense of warmth and light. The method 200 continues to step 220.

In step 220, a driver emotion profile is determined based on sensor data captured by a driver emotion monitoring sensor. As discussed above, the driver monitoring sensor 16 is a sensor used to capture information about a driver so as to enable inferring or otherwise determining aspects of the driver's emotional state. The driver monitoring sensor 16 is a driver-facing camera that captures visible light images of the driver's face and/or other portions of the driver's body, and the captured visible light images are then processed in order to determine an emotion of the driver, such as, for example, whether the driver is happy, calm, anxious, or enraged. The method 200 continues to step 230.

Figure 3:
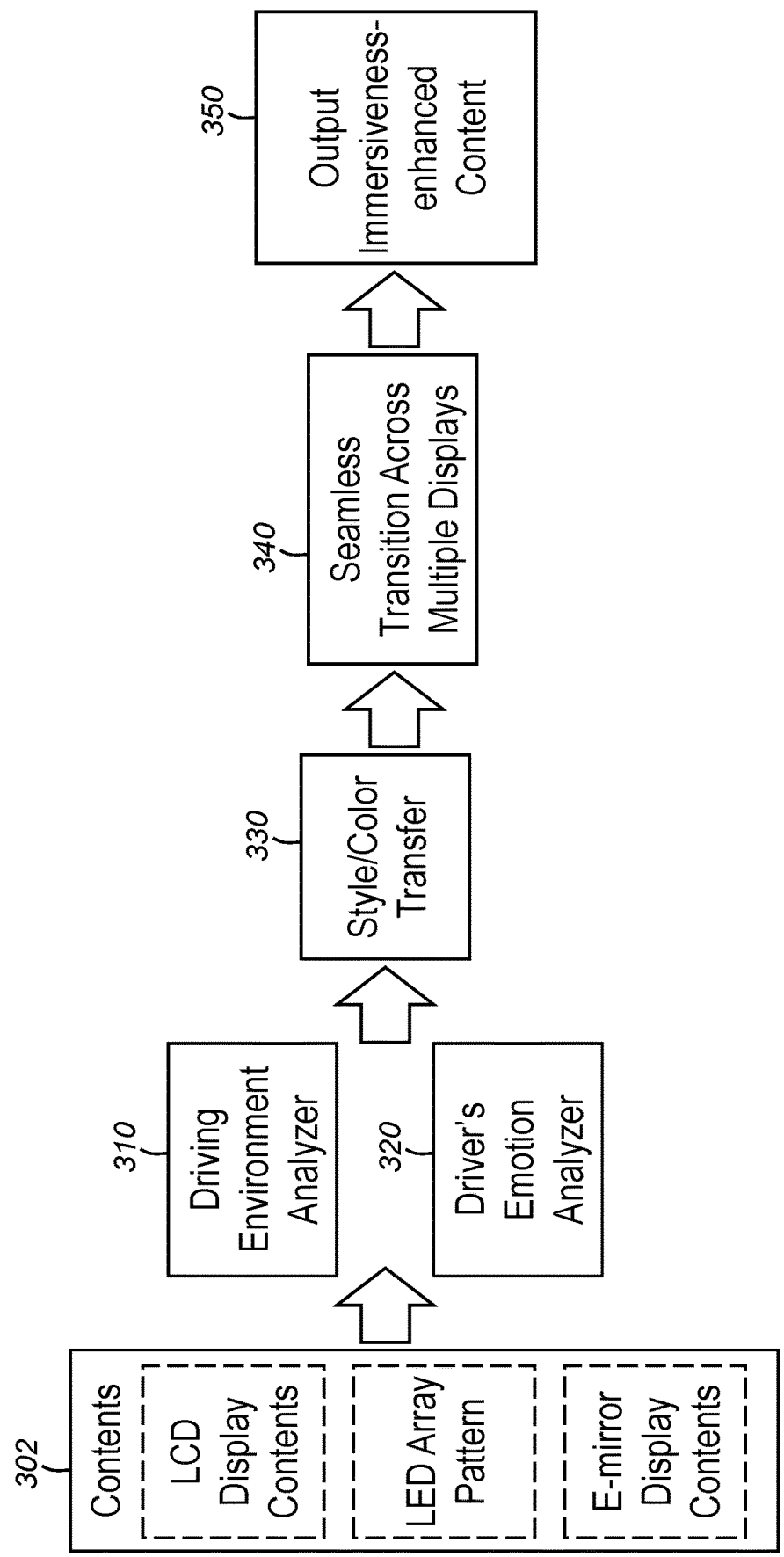
FIG. 3 is a block diagram illustrating an in-vehicle immersive display framework and process flow, according to one embodiment.

In step 230, a visual output for an immersive display system is determined based on the color tone profile and the texture style profile. This determination is discussed with reference to FIG. 3, which depicts an embodiment of an in-vehicle immersive display framework 300. The framework 300 includes the driving environment analyzer module 310, driver's emotion analyzer module 320, style/color transfer module 330, and seamless transition compensation module 340. In general, each of the modules 310-340 is implemented using a processor and memory, where the processor executes computer instructions that, when executed by the processor, cause the functionality attributed to the respective module 310-340 to be performed.

The driving environmental analyzer module 310 constructs the color tone profile, Pc, and texture style profile, Pt, based on a captured image from a camera, such as from the exteriorly-facing camera 18, which may be a front-driving view camera, rear-view camera, or e-mirror camera. The color tone profile, Pc, is constructed by analyzing the color statistics of the environment image, e.g., means and variances of each channel in the Lab color space. The texture style profile, Pt, is constructed by analyzing the local and global shape and texture of the environment image. Of course, in other embodiments, other techniques may be used for determining the color tone profile and the texture style profile.

The driver's emotion analyzer module 320 constructs a driver emotion profile, Pe, based on the in-cabin monitoring camera output image. The driver emotion profile, Pe, is obtained via an image analysis and machine learning algorithm. In the present embodiment, the driver emotion profile is 2-dimensionally represented in terms of valence and arousal. Valence refers to whether the emotion is more positive or negative, and arousal refers to the amount of activation in the emotion.

In embodiments, the driver emotion profile is represented as a tensor matrix, which may represent emotional attributes or characteristics. Here, the driver emotion profile is a regressive output represented by one or more tensors. In this context, a regressive output implies that the emotion profile is represented as a continuous output rather than discrete categories. This output can be represented by one or more tensors, where each tensor is a multi-dimensional array containing elements that represent specific emotional attributes or parameters. This tensor matrix, together with an input image, may be fed into a neural network in order to generate a modified image, at least in one embodiment. The neural network, which could be any type of machine learning model capable of processing this data (e.g., a Convolutional Neural Network), would then generate an output image. This output image is modified based on the emotion represented in the tensor matrix, which incorporates the emotion into the image. In another embodiment, emotions are discretely classified, which means that instead of using a continuous spectrum of emotions represented in the tensor matrix, each emotion is distinctly categorized. Associated information related to each discrete emotion category is then used to modify an input image. This could involve applying specific filters or transformations that correspond to each emotion category. Both these embodiments allow for the incorporation of emotional data into image processing via a neural network, but they handle the representation of emotions differently. In embodiments, the driver emotion profile includes values that each may be associated with one of a plurality of predetermined emotions. And, in embodiments, each predetermined emotion is associated with modification data indicating how the emotion affects the visual output, such as a particular set of hues to use or not use, a brightness range or increase amount, etc.

The color/style transfer module 330 adjusts the color and/or style of the input contents based on the driving environment profiles, Pc, Pt, and the emotional status profile Pe. In one embodiment, the color of the input contents is adjusted via a color transfer algorithm that is based on the driving environment color tone profile Pc, while the style of the input contents is adjusted via a style transfer algorithm based on the driving environment texture style profile, Pt.

Color transfer algorithms are techniques used in computer graphics and image processing to apply the color characteristics of one image to another. This is commonly used to make images appear as if they were taken under similar lighting conditions, or to achieve a specific artistic effect. A color transfer algorithm generally includes: color space conversion, statistical analysis of color information, color mapping based on the mean/standard deviation, and color space reconversion. In one embodiment, the color transfer algorithm used is the one set forth in S. Liu and M. Pei, "Texture-Aware Emotional Color Transfer Between Images," in IEEE Access, vol. 6, pp. 31375-31386, 2018, doi: 10.1109/ACCESS.2018.2844540. For example, this document describes a framework for emotion-based color transfer in images. The method involves three main steps. First, if the input is a reference image, the main colors and texture features of the image are extracted and used to calculate the target emotion coordinate value in emotion scales using a proposed emotion calculation model. If the input is an emotion word, a semantic similarity algorithm is used to find the nearest landmark word in databases, which is then regarded as the target emotion. The next step involves searching the emotion database to find the most matching target emotion. These databases are built using theoretical and empirical concepts from art theories that include color models, corresponding emotion coordinates, emotion words, and hue number (HN) and color number (CN). The closest color combinations are then obtained from one of the model databases. This color transfer framework may be used for texture-aware emotional color transfer that changes an image's colors to meet a desired emotion calculated from a reference image or an emotion word. In other embodiments, other color transfer algorithms may be used.

Style transfer algorithms are generally used for interpolating between two images together in such a way that one image adopts the style of the other. This technique is widely used in digital art and image processing to create desired visual effects, such as for replicating a look and feel of a surrounding vehicle environment (e.g., snowy, verdant, urban). Style transfer involves using a convolutional neural network (CNN) to merge the content features of one image with the style features of another, optimizing through iterative processes like gradient descent to create a new image that combines the original content with the artistic style of the second image.

In one embodiment, the style transfer algorithm used is the one set forth in M. Elad and P. Milanfar, "Style Transfer Via Texture Synthesis," in IEEE Transactions on Image Processing, vol. 26, no. 5, pp. 2338-2351, May 2017, doi: 10.1109/TIP.2017.2678168. In Elad et al., the proposed style transfer algorithm uses a pre-trained CNN to apply the artistic style of one image (style reference) onto another (content image) while preserving its content. The algorithm involves three images: the content, style reference, and a generated image, which initially is a copy of the content image. The algorithm uses the CNN to extract feature representations from both images. High-level details are extracted from the content image, while textures and colors are extracted from the style image. The style is captured using gram matrices, a mathematical representation of the correlation between different features in an image. This is done at each layer of the network to capture varying levels of detail. The algorithm defines a loss function comprising content loss (difference in content between the generated and content images) and style loss (difference in style between the generated and style images). The algorithm aims to minimize this loss function using backpropagation and gradient descent, iteratively updating the generated image until convergence. The final output is an image that combines the content of the content image with the style of the style image. Despite being computationally intensive due to the use of deep learning and iterative process, the results are visually impressive. In other embodiments, other style transfer algorithms may be used.

The color of the input contents is also adjusted based on the emotional status profile, Pc, in the direction of boosting the driver's positive emotion or alleviating the driver's negative emotion. The color adjustment is conducted in valence and arousal space (Russell, J.: A circumplex model of affect. Journal of personality and social psychology 39(6), 1161-1178 (1980)) based on the relationship between emotion and color (Color and emotion: effects of hue, saturation, and brightness, Psychological Research, 2018). For example, arousal is increased from blue and green to red, and valence ratings are highest for saturated and bright colors. As a more specific example, in order to suppress anger, the color tone is adjusted to less saturated dark-blue (dark-green) colors than saturated red; and, in order to boost happiness, the color tone is adjusted to saturated orange/yellowish/pink colors.

Across different displays in the in-cabin immersive displays and system, the transition is visible due to the hardware physical boundaries, different resolutions, and different color gamut. The seamless transition compensation module 350 addresses this problem by applying color correction and gradual blur compensation. For example, U.S. Pat. No. 11,620,099, issued Apr. 4, 2023, describes a display system and method for color matching multiple displays, such as those that may be used in an automobile; the description of the display system and method in U.S. Pat. No. 11,620,099 is hereby incorporated by reference in its entirety and attributed to the presently disclosed embodiments to the extent the description is not inconsistent with the description herein.

The visual output may be provided to one or more display devices, such as one or more of the following: the electronic display 18, the e-mirror display 20, the instrument cluster 22, and/or the sparse LEDs 24. The method 300 then ends.

The method 300 may be performed continuously so as to continuously receive new image data from the exteriorly-facing camera 14 and/or driver monitoring sensor data, and then determine an updated visual output, which may be relatively subtle changes (e.g., minor hue changes in background graphics) or may be more significant (e.g., selecting a new primary foreground graphic to display).

The method 300 may be continuously performed so as to generate an immersive visual output for an immersive display subsystem, which refers to the light generating devices used for outputting the visual output for the in-vehicle immersive display system.

Figure 4:
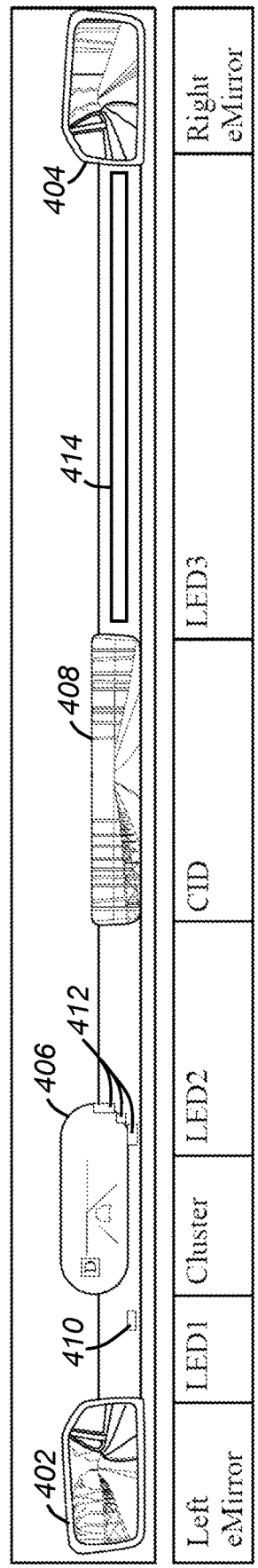
FIG. 4 is a block diagram depicting an arrangement of display devices and other light sources used as a part of an in-vehicle immersive display system, according to embodiment.

With reference to FIG. 4, there is shown an in-vehicle immersive display subsystem 400, which includes a variety of light generating devices, including displaying devices and ambient/diffuse devices. Particularly, the in-vehicle immersive display subsystem 400 includes a left electronic mirror ("eMirror" or "e-mirror") 402, a right electronic mirror 404, an instrument cluster 406, a central information display (CID) 408, a first LED device 410, a second LED device 412, and a third LED device 414. The in-vehicle immersive display subsystem 400 may be used as a part of the in-vehicle immersive display system 10; for example, the CID 408 corresponds to the electronic display 18, the electronic mirrors 402,404 correspond to the e-mirror display 20, the instrument cluster 406 corresponds to the instrument cluster lights 22, and the LED devices 410-414 correspond to the sparse LEDs 24. Of course, in other embodiments, other in-vehicle immersive display subsystems having different devices, arrangements, and/or other characteristics may be used, as the in-vehicle immersive display subsystem 400 is but one embodiment.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the word "enhancement", "enhanced", and its other forms are not to be construed as limiting the invention to any particular type or manner of visual presentation or output, but are generally used for facilitating understanding of the above-described technology, and particularly for conveying that such technology aims to introduce visual aspects into the in-cabin or in-vehicle environment in order to provide a more positively-receptible environment for the driver or other passenger(s).

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of generating a visual output for a vehicle cabin, comprising the steps of:
    determining a color tone profile, a texture style profile and/or a driver emotion profile, wherein the color tone profile and/or the texture style profile are determined based on image data captured by an exteriorly-facing camera, wherein the driver emotion profile is determined based on sensor data captured by a driver monitoring sensor, and wherein the driver monitoring sensor is a sensor used to capture information about a driver so as to enable inferring or otherwise determining aspects of the driver's emotional state; and
    determining a visual output based on the driver emotion profile, the color tone profile, and/or the texture style profile, wherein the visual output is an immersive visual output that includes a display output and a light output, wherein the display output is information indicating an output for a display screen, and wherein the light output is information indicating an output for an ambient or diffuse light source.

2. The method of claim 1, wherein the method includes determining the color tone profile, wherein the visual output is determined based on using a color transfer algorithm that generates output color information based on input color information, and wherein the input color information is or is generated based on color information within the image data as represented by the color tone profile.

3. The method of claim 2, wherein the image data represents an image of a scene, and wherein the color information within the image data corresponds to color information of one or more pixels within a determined region of the image.

4. The method of claim 3, wherein the determined region of the image is determined based on output of a classifier, and wherein the classifier is used to classify portions of the image.

5. The method of claim 3, wherein the determined region of the image is predetermined based on one or more pixel coordinates of the image.

6. The method of claim 1, wherein the method includes determining the driver emotion profile, and wherein the driver emotion profile specifies one or more emotions selected from a plurality of predetermined emotions, and wherein each emotion of the plurality of predetermined emotions is associated with modification data indicating how the emotion affects the visual output.

7. The method of claim 6, wherein the method includes determining the driver emotion profile, and wherein the driver emotion profile is a regressive output represented by one or more tensors.

8. The method of claim 1, further comprising the step of continuously obtaining updated image data from the exteriorly-facing camera, wherein the determining steps are each performed using the updated image data so as to determine an updated visual output as the visual output for each iteration, and wherein presentation of the visual output is continuously updated in accordance with the updated visual output.

9. An in-vehicle immersive display system, comprising:
    an electronic display installed in a vehicle and configured to provide a display output;
    a light generating device installed in the vehicle and configured to provide a light output;
    a camera installed in the vehicle and configured to provide image data; and
    a controller installed in the vehicle and configured to determine the display output and the light output based at least in part on the image data, wherein a visual output is displayed by the immersive display system and is constituted by the display output and the light output, and wherein the visual output is information indicating an output for a display screen of the electronic display and an output for an ambient light source of the light generating device.

10. The in-vehicle immersive display system of claim 9, wherein the controller is further configured to: determine a color tone profile and a texture style profile based on the image data captured by the camera; determine a driver emotion profile based on sensor data captured by a driver monitoring sensor; and determine the visual output for the immersive display system based on the color tone profile and the texture style profile.

11. The in-vehicle immersive display system of claim 10, wherein the driver emotion profile specifies one or more emotions selected from a plurality of predetermined emotions, and wherein each emotion of the plurality of predetermined emotions is associated with modification data indicating how the emotion affects the visual output.

12. The in-vehicle immersive display system of claim 11, wherein the driver emotion profile is a regressive output represented by one or more tensors.

13. The in-vehicle immersive display system of claim 9, the display output and the light output are determined based on using a color transfer algorithm that generates output color information based on input color information, and wherein the input color information is, or is generated based on, color information within the image data.

14. The in-vehicle immersive display system of claim 13, wherein the image data represents an image of a scene, and wherein the color information within the image data corresponds to color information of one or more pixels within a determined region of the image.

15. The in-vehicle immersive display system of claim 14, wherein the determined region of the image is determined based on output of a classifier, and wherein the classifier is used to classify portions of the image.

16. The in-vehicle immersive display system of claim 14, wherein the determined region of the image is predetermined based on one or more pixel coordinates of the image.

17. The in-vehicle immersive display system of claim 9, wherein the controller is further configured to continuously obtain updated image data from the camera, wherein the determining operations are each performed using the updated image data so as to determine an updated visual output as the visual output for each iteration, and wherein display of the visual output is continuously updated in accordance with the updated visual output.

18. An in-vehicle immersive display system, comprising:
an electronic display installed in a vehicle and configured to provide a display output;
a diffuse light generating device installed in the vehicle and configured to provide a light output;
an exteriorly-facing camera installed in the vehicle and configured to provide image data;
a driver monitoring sensor installed in the vehicle and configured to provide driver monitoring sensor data; and
a controller installed in a vehicle and configured to determine the display output and the light output based at least in part on the image data provided by the exteriorly-facing camera and the driver monitoring sensor data provided by the driver monitoring sensor, wherein a visual output is displayed by the immersive display system and is constituted by the display output and the light output, and wherein the visual output is information indicating an output for a display screen of the electronic display and an output for an ambient light source of the light generating device.

* * * * *